(12) United States Patent
Cheng et al.

(10) Patent No.: US 8,403,286 B2
(45) Date of Patent: Mar. 26, 2013

(54) THREE-DIMENSIONAL PRINTING DEVICE

(75) Inventors: Chen-Hsing Cheng, Taipei Hsien (TW); Hsing-Yi Hu, Taipei Hsien (TW); Wuu-Jyi Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 392 days.

(21) Appl. No.: 12/764,234

(22) Filed: Apr. 21, 2010

(65) Prior Publication Data

US 2011/0011992 A1   Jan. 20, 2011

(30) Foreign Application Priority Data

Jul. 14, 2009 (CN) .......................... 2009 1 0157568

(51) Int. Cl.
*F16M 13/00* (2006.01)
*F16M 11/00* (2006.01)
*F16M 11/38* (2006.01)
*A47G 29/00* (2006.01)
*B41J 29/13* (2006.01)
*B41J 2/00* (2006.01)

(52) U.S. Cl. ..................... 248/571; 248/157; 248/176.1; 248/674; 248/125.8; 248/676; 248/127; 248/224.8; 248/688; 248/677; 248/188.8; 248/170; 248/173; 347/108; 347/152; 347/170; 347/222; 347/242; 347/245; 347/257; 347/263

(58) Field of Classification Search .............. 248/227.2, 248/581, 157, 176.1, 176.3, 676, 174, 247, 248/674, 125.8, 165, 144.11, 147.19, 153.1, 248/158, 127, 371, 398, 534, 535, 536, 224.8, 248/354.6, 688, 677, 188.8, 170, 173; 347/108, 347/152, 170, 222, 242, 245, 257, 263
See application file for complete search history.

(56) References Cited

U.S. PATENT DOCUMENTS

| | | | | |
|---|---|---|---|---|
| 2,744,795 A * | 5/1956 | McDonough et al. | ..... | 182/183.1 |
| 3,272,284 A * | 9/1966 | Lincoln | ........................ | 182/224 |
| 3,349,783 A | 10/1967 | Ellis | | |
| 3,860,206 A * | 1/1975 | Wenig | ............................ | 248/677 |
| 4,033,531 A * | 7/1977 | Levine | .......................... | 248/558 |
| 4,582,167 A * | 4/1986 | Contreras | .................. | 182/182.1 |
| 5,636,816 A * | 6/1997 | Burton et al. | ................. | 248/208 |
| 5,709,359 A * | 1/1998 | Riley | ............................. | 248/201 |
| 5,863,017 A * | 1/1999 | Larson et al. | ............... | 248/176.1 |
| 6,164,218 A * | 12/2000 | Donalson | ................ | 108/144.11 |
| 6,223,358 B1 * | 5/2001 | DePietro | ........................... | 4/498 |
| 6,349,837 B1 * | 2/2002 | Serban | ............................ | 211/26 |
| 6,739,562 B2 * | 5/2004 | Rice | ................................ | 248/247 |
| 7,591,056 B2 * | 9/2009 | Mimlitch et al. | ............. | 29/401.1 |
| 7,686,264 B2 * | 3/2010 | Dicke | ......................... | 248/188.7 |
| 7,780,586 B2 * | 8/2010 | Gates | ............................ | 482/142 |

(Continued)

FOREIGN PATENT DOCUMENTS

CN 201227612 Y 4/2009
KR 20030069916 A 8/2003

*Primary Examiner* — Terrell McKinnon
*Assistant Examiner* — Christopher Garft
(74) *Attorney, Agent, or Firm* — Altis Law Group, Inc.

(57) ABSTRACT

A three-dimensional printing device includes a top bracket, a side bracket, and a pivoting member. The top bracket includes a pair of sidewalls cooperatively defining a receiving space to receive an inkjet head. The side bracket includes a pair of sidewalls cooperatively defining a receiving space to receive the top bracket. The pivoting member includes a pair of sidewalls cooperatively defining a receiving space to receive an inkjet head. The pivoting member is rotatably mounted in the receiving space of the side bracket.

3 Claims, 4 Drawing Sheets

U.S. PATENT DOCUMENTS

| | | | |
|---|---|---|---|
| 2004/0069913 A1* | 4/2004 | Martens | 248/161 |
| 2004/0149881 A1* | 8/2004 | Allen | 248/676 |
| 2005/0083392 A1* | 4/2005 | Silverbrook | 347/108 |
| 2007/0097194 A1* | 5/2007 | Silverbrook | 347/101 |
| 2007/0281841 A1* | 12/2007 | Gates | 482/142 |
| 2009/0137372 A1* | 5/2009 | Gates | 482/142 |
| 2009/0303286 A1* | 12/2009 | Silverbrook | 347/40 |
| 2009/0308991 A1* | 12/2009 | Stengel | 248/125.8 |
| 2011/0011992 A1* | 1/2011 | Cheng et al. | 248/201 |
| 2011/0012961 A1* | 1/2011 | Hu et al. | 347/47 |
| 2011/0172611 A1* | 7/2011 | Yoo et al. | 604/290 |
| 2011/0260018 A1* | 10/2011 | Fritz | 248/201 |
| 2012/0097830 A1* | 4/2012 | Magnani et al. | 248/688 |

* cited by examiner

THREE-DIMENSIONAL PRINTING DEVICE

BACKGROUND

1. Technical Field

The disclosure generally relates to printers, and particularly to a three-dimensional printing device.

2. Description of Related Art

Computer printers typically print on sheet media such as paper or transparencies. Some printers utilize a nozzle of an inkjet head to print on a planar surface of a workpiece. However, non-planar surfaces cannot be printed.

What is needed, therefore, is a three-dimensional printing device addressing the limitations described.

DETAILED DESCRIPTION OF THE EMBODIMENT

Figure 1:
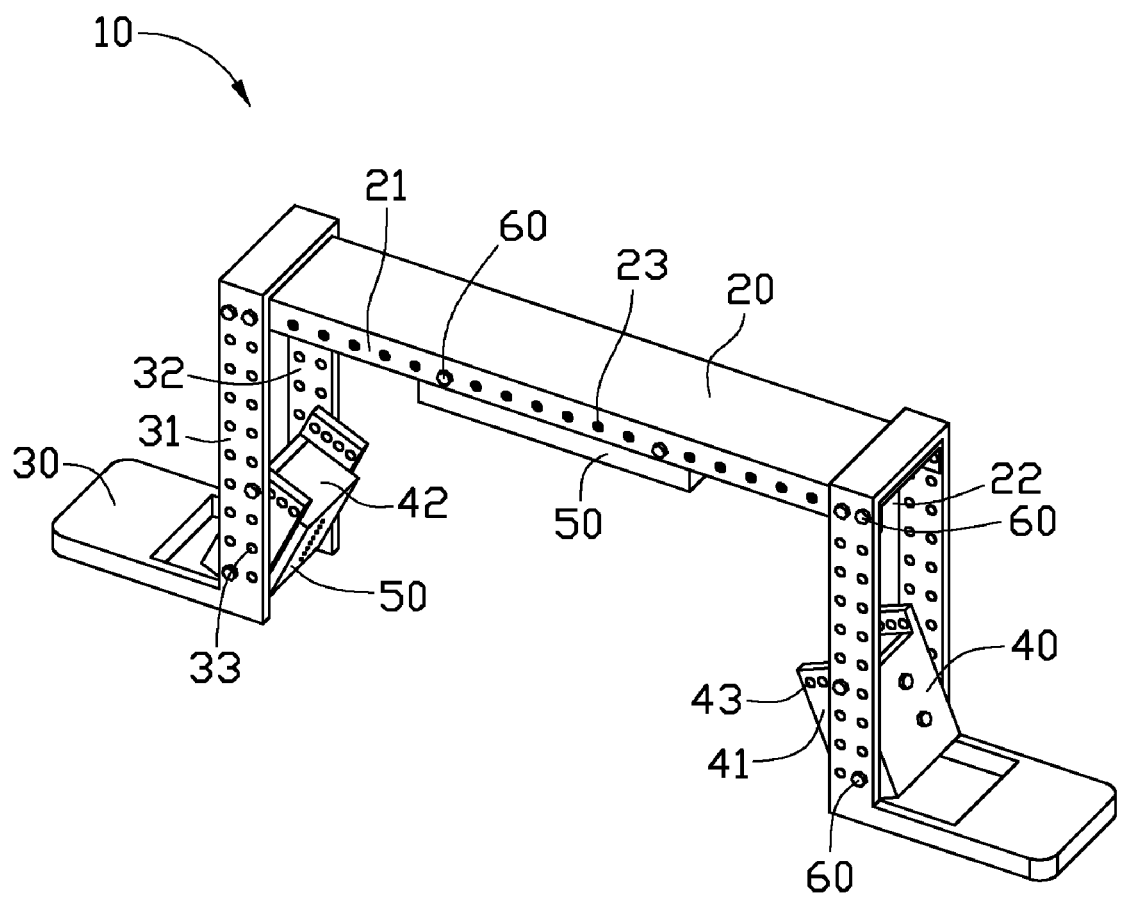
FIG. 1 is a perspective view of an embodiment of a three-dimensional printing device.
Figure 2:
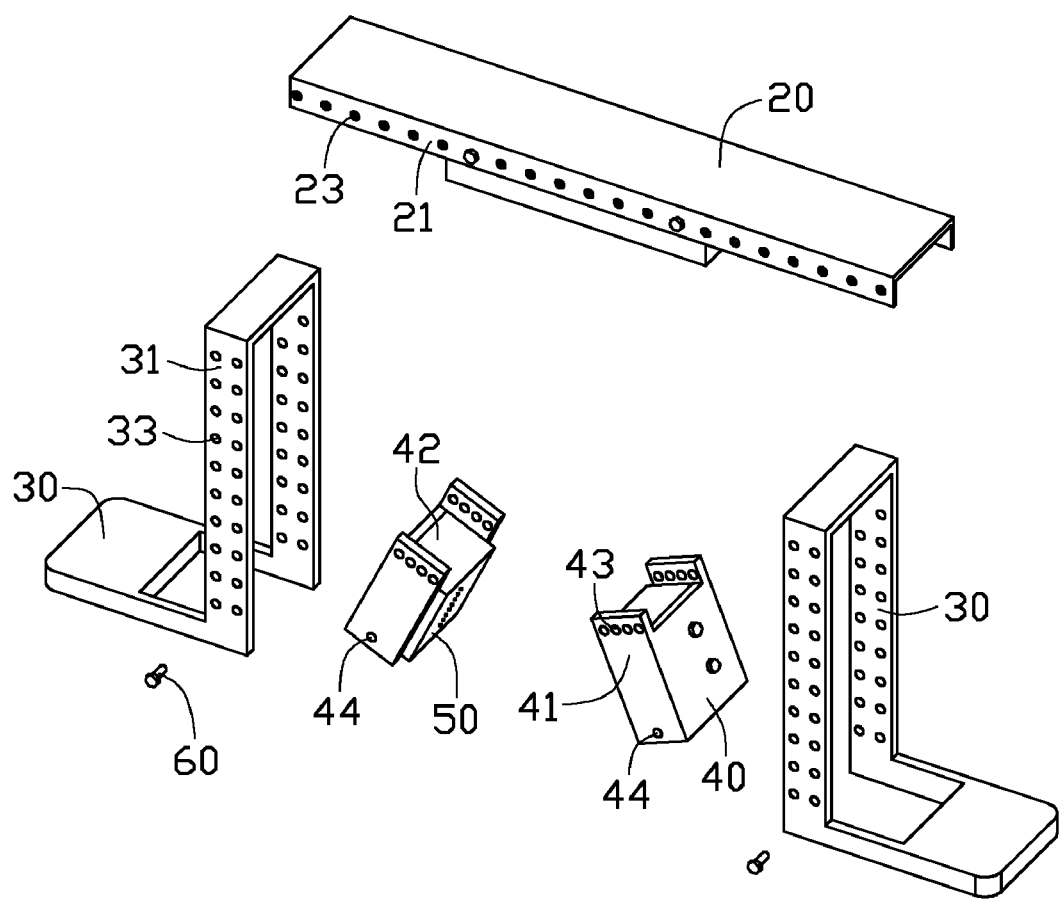
FIG. 2 is an exploded perspective view of the three-dimensional printing device of FIG. 1.

Referring to FIGS. 1 and 2, an embodiment of a three-dimensional printing device 10 includes a top bracket 20, a pair of side brackets 30, a pair of pivoting members 40 and a plurality of inkjet heads 50.

The top bracket 20 includes a pair of sidewalls 21 cooperatively defining a receiving space 22. A plurality of fixing holes 23 are defined in the two sidewalls 21, connecting with the receiving space 22. One or more inkjet heads 50 is received in the receiving space 22 of the top bracket 20. A plurality of fasteners 60 are received in receiving holes on the inkjet head 50 after passing through corresponding fixing holes 23 on the top bracket 20. The inkjet head 50 is thus fastened to the top bracket 20.

Each side bracket 30 includes a pair of sidewalls 31 cooperatively defining a receiving space 32. A plurality of fixing holes 33 are defined in the two sidewalls 31, connecting with the receiving space 32. The top bracket 20 is received in the receiving space 32 of the side bracket 30. A plurality of fasteners 60 are received in the fixing holes 23 on the top bracket 20 after passing through corresponding fixing holes 33 on the side bracket 30. The top bracket 20 is thus fastened to the side bracket 30.

Each pivoting member 40 includes a pair of sidewalls 41 cooperatively defining a receiving space 42. A plurality of pivoting holes 43 are defined in a first end of the two sidewalls 41. A fixing hole 44 is defined in a second end of the two sidewalls 41. One or more inkjet heads 50 is received in the receiving space 42 of the pivoting member 40. The pivoting member 40 is positioned in the receiving space 32 of the side bracket 30. A plurality of fasteners 60 are received in the pivoting hole 43 and the fixing hole 44 on the sidewall 41 after passing through corresponding fixing holes 33 on the side bracket 30. The pivoting member 40 is thus fastened to the side bracket 30.

Figure 3:
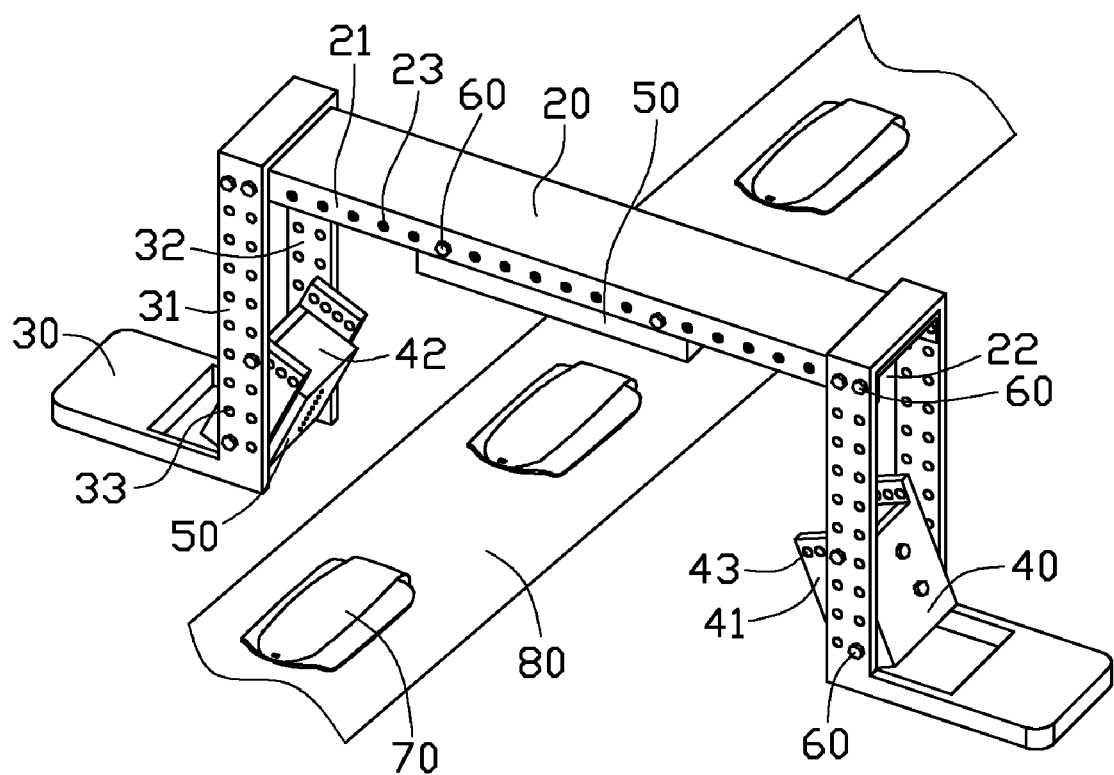
FIG. 3 is a schematic view of the three-dimensional printing device of FIG. 1.

Referring to FIG. 3, when a workpiece 70 is introduced into the three-dimensional printing device 10 by a conveyer belt 80, the inkjet heads 50 print on a top surface and side surfaces of the workpiece 70.

Figure 4:
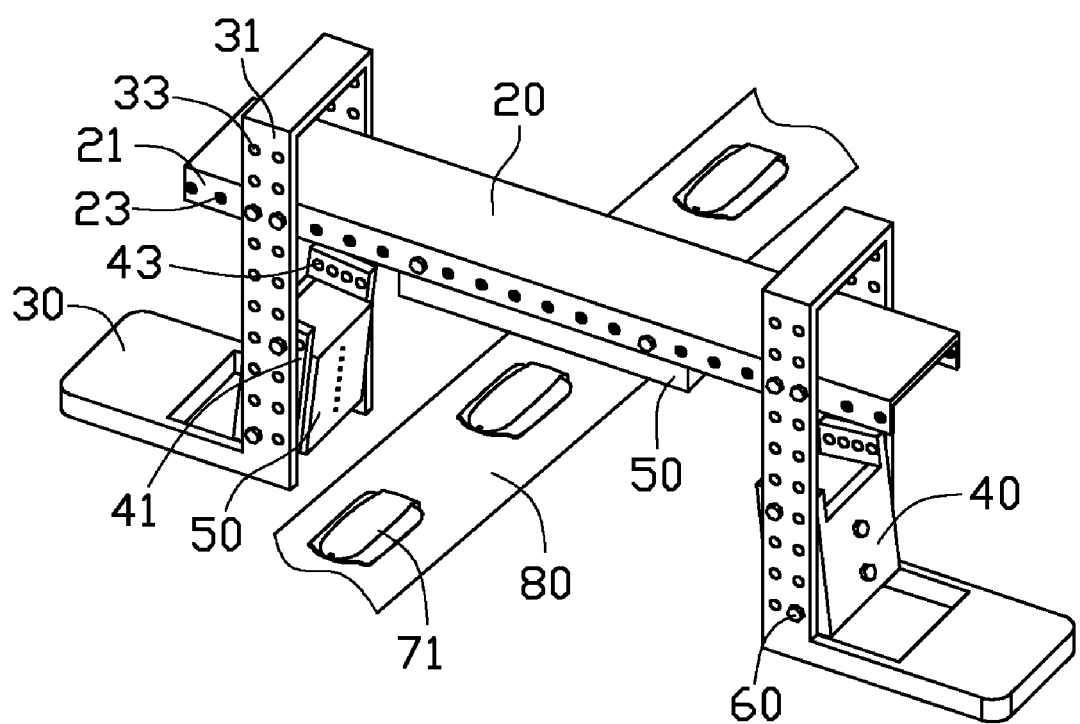
FIG. 4 is another schematic view of the three-dimensional printing device of FIG. 1.

The location and the angle of the inkjet heads 50 can be adjusted based on printing requirements. The distance between the pair of side brackets 30 and the height of the top bracket 20 can be adjustable. Referring to FIG. 4, when a smaller workpiece 71 is introduced into the three-dimensional printing device 10 by the conveyer belt 80, the inkjet heads 50 print on a top surface and two side surfaces of the smaller workpiece 71.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A three-dimensional printing device comprising:
a top bracket comprising a pair of sidewalls cooperatively defining a receiving space to receive a first inkjet head;
a side bracket comprising a pair of sidewalls cooperatively defining a receiving space to receive the top bracket, each of the pair of sidewalls of the side bracket defining a plurality of first fixing holes; and
a pivoting member comprising a pair of sidewalls cooperatively defining a receiving space to receive a second inkjet head, each of the pair of sidewalls of the pivoting member defining a plurality of pivoting holes in a first end of the pair of sidewalls of the pivoting member adjacent to the top bracket and a second fixing hole defining in a second end of the pair of sidewalls of the pivoting member away from the top bracket, wherein the first end of the pivot member is fixed to the side bracket via a first fastener passing through two pivoting holes and two corresponding first fixing holes, the second end of the pivoting member is fixed to the side bracket via a second fastener passing through the second fixing hole and one corresponding fixing hole, the pivoting member is rotatably mounted in the receiving space of the side bracket, and the rotation angle of the pivot member is capable of being adjusted.

2. The three-dimensional printing device as claimed in claim 1, wherein a plurality of third fixing holes are defined in each of the pair of sidewalls of the top bracket, and a plurality of third fasteners pass through corresponding third fixing holes of the top bracket to fix the first inkjet head.

3. The three-dimensional printing device as claimed in claim 2, wherein the top bracket is received in the receiving space of the side bracket, and a plurality of third fasteners are received in the third fixing holes of the top bracket after passing through corresponding first fixing holes of the side bracket.

* * * * *